US008963510B1

(12) United States Patent
Larson

(10) Patent No.: US 8,963,510 B1
(45) Date of Patent: Feb. 24, 2015

(54) ACYCLIC EXCITER FOR AN ALTERNATOR

(71) Applicant: Kohler Co., Kohler, WI (US)

(72) Inventor: Adam Larson, Mequon, WI (US)

(73) Assignee: Kohler Co., Kohler, WI (US)

( * ) Notice: Subject to any disclaimer, the term of this patent is extended or adjusted under 35 U.S.C. 154(b) by 34 days.

(21) Appl. No.: 13/974,834

(22) Filed: Aug. 23, 2013

(51) Int. Cl.
H02P 9/10 (2006.01)
H02P 9/14 (2006.01)
H02K 19/28 (2006.01)
H02P 9/02 (2006.01)
H02K 31/00 (2006.01)

(52) U.S. Cl.
CPC . *H02K 19/28* (2013.01); *H02P 9/02* (2013.01)
USPC .............................................. 322/59; 310/178

(58) Field of Classification Search
USPC .............................................. 322/59; 310/178
See application file for complete search history.

(56) References Cited

U.S. PATENT DOCUMENTS

| 278,516 | A |  | 5/1883 | Delafield | 310/178 |
|---|---|---|---|---|---|
| 806,217 | A |  | 12/1905 | Wait | 310/178 |
| 992,300 | A |  | 5/1911 | Walker | 310/162 |
| 2,145,424 | A | * | 1/1939 | McDowell | 322/25 |
| 2,414,287 | A | * | 1/1947 | Crever | 322/59 |
| 2,546,877 | A | * | 3/1951 | Taltavull | 322/27 |
| 3,770,996 | A | * | 11/1973 | Cherry | 310/68 D |
| 4,896,062 | A | * | 1/1990 | Pollard | 310/68 D |
| 5,278,470 | A | * | 1/1994 | Neag | 310/178 |
| 5,714,821 | A | * | 2/1998 | Dittman | 310/179 |
| 5,736,707 | A |  | 4/1998 | Nied et al. | 219/117.1 |
| 5,977,684 | A | * | 11/1999 | Lin | 310/268 |
| 6,051,905 | A | * | 4/2000 | Clark | 310/178 |
| 6,822,361 | B1 | * | 11/2004 | Roschin et al. | 310/178 |
| 2011/0210636 | A1 | * | 9/2011 | Kuhlmann-Wilsdorf | 310/178 |

OTHER PUBLICATIONS

McGraw Publishing Company, Standard Handbook for Electrical Engineers (1908) p. 360.

* cited by examiner

*Primary Examiner* — Pedro J Cuevas
(74) *Attorney, Agent, or Firm* — Michael Best & Friedrich LLP

(57) ABSTRACT

A self-excited alternator for generating electrical energy. The alternator includes a stator, a rotor, and an exciter. The rotor includes conductors which are integrated within the rotor via one of a casting process, a welding process, or a fastening process. The exciter includes a magnet producing a static magnetic field, and a rotatable conductive member coupled to the shaft and electrically coupled to the one or more conductors. The rotatable conductive member is operable to output the direct current to the one or more conductors upon rotation within the static magnetic field, thus exciting the alternator.

24 Claims, 5 Drawing Sheets

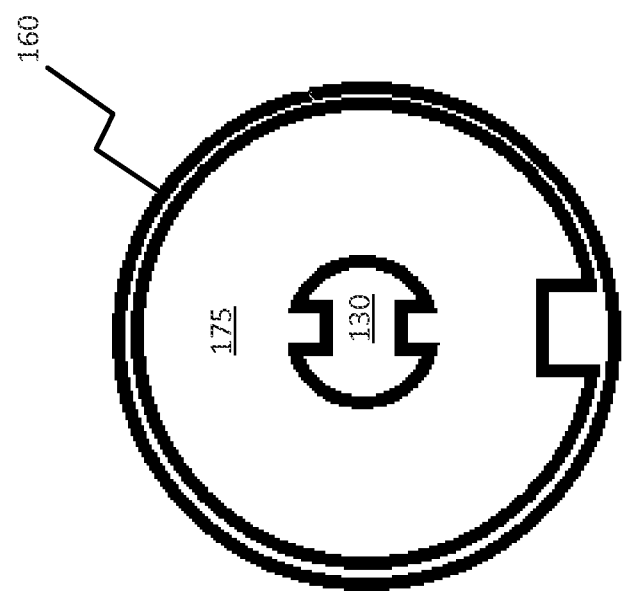
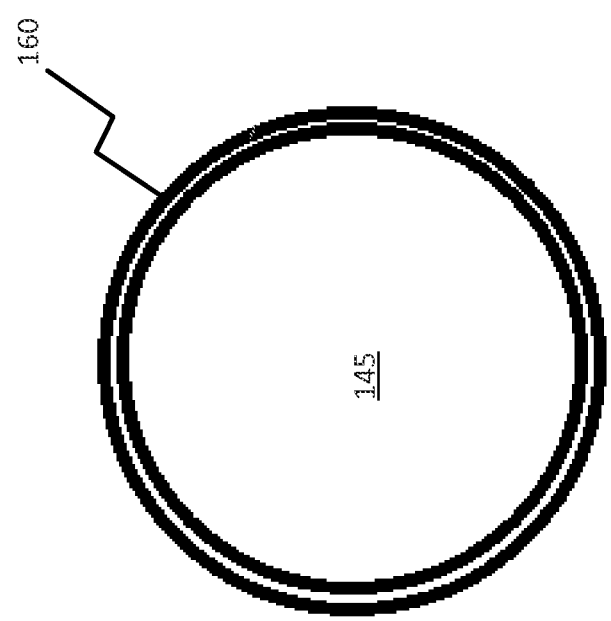
Fig. 3B
Fig. 3A

ACYCLIC EXCITER FOR AN ALTERNATOR

BACKGROUND

The present invention relates to power generation systems and, more specifically, to alternators. Alternators convert mechanical energy into electrical energy in the form of alternating current. Commonly, alternators comprise a rotor and a stator. Certain types of alternators need excitation in order to begin outputting electrical energy. In many instances, such as in large alternators, the excitation is performed by an external exciter.

Exciters can take the form of an electrical generator. Typically, AC generators are used in exciters. The AC current produced by such generators is often rectified so that a DC current may be used in the excitation. Of course, rectification requires the use of some type of rectifier. Rectifiers able to handle high currents are generally expensive.

SUMMARY

In addition to AC generators, another type of electrical generator is a homopolar generator (e.g., unipolar generator, acyclic generator, disk dynamo, or Faraday disc). A homopolar generator includes an electrically conductive disc or cylinder rotating perpendicular to a magnetic field. As a result of the rotation, a direct current is produced. Although known in general, homopolar generators are not widely used.

In one embodiment, the invention provides a self-excited alternator for generating electrical energy. The self-excited alternator is not excited by an external exciter, but rather is excited by an exciter included within the alternator. The alternator further includes a stator and a rotor. The stator includes a plurality of armature coils, and an electrical output terminal electrically connected to the plurality of armature coils. The rotor is operable to rotate within the stator and includes a shaft, and one or more conductors operable to receive a direct current and produce a rotor magnetic field upon receiving the direct current. The conductors are integrated within the rotor via one of a casting process, a welding process, or a fastening process. The exciter includes a magnet producing a static magnetic field, and a rotatable conductive member coupled to the shaft and electrically coupled to the one or more conductors. The rotatable conductive member is operable to output the direct current to the one or more conductors upon rotation within the static magnetic field. The rotation of the rotor magnetic field within the stator produces an alternating current through the plurality of armature coils. The alternating current is output via the electrical output.

In another embodiment the invention provides a method of self-exciting an alternator. The method includes producing a static magnetic field; rotating a rotatable conductive member within the static magnetic field; and outputting a direct current produced as a result of rotating the rotatable conductive member within the static magnetic field. The method also includes receiving the direct current at a plurality of conductors positioned within a rotor; rotating the rotor within a stator to produce a rotating magnetic field; and outputting an alternating current from the stator. The alternating current is produced as a result of the rotating magnetic field. The conductors are positioned within the rotor via one of a casting process, a welding process, or a fastening process.

Other aspects of the invention will become apparent by consideration of the detailed description and accompanying drawings.

BRIEF DESCRIPTION OF THE DRAWINGS

FIG. 3A is a front view of a portion of an exciter of the alternator of FIG. 1.

FIG. 3B is a back view of the exciter of FIG. 3A.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
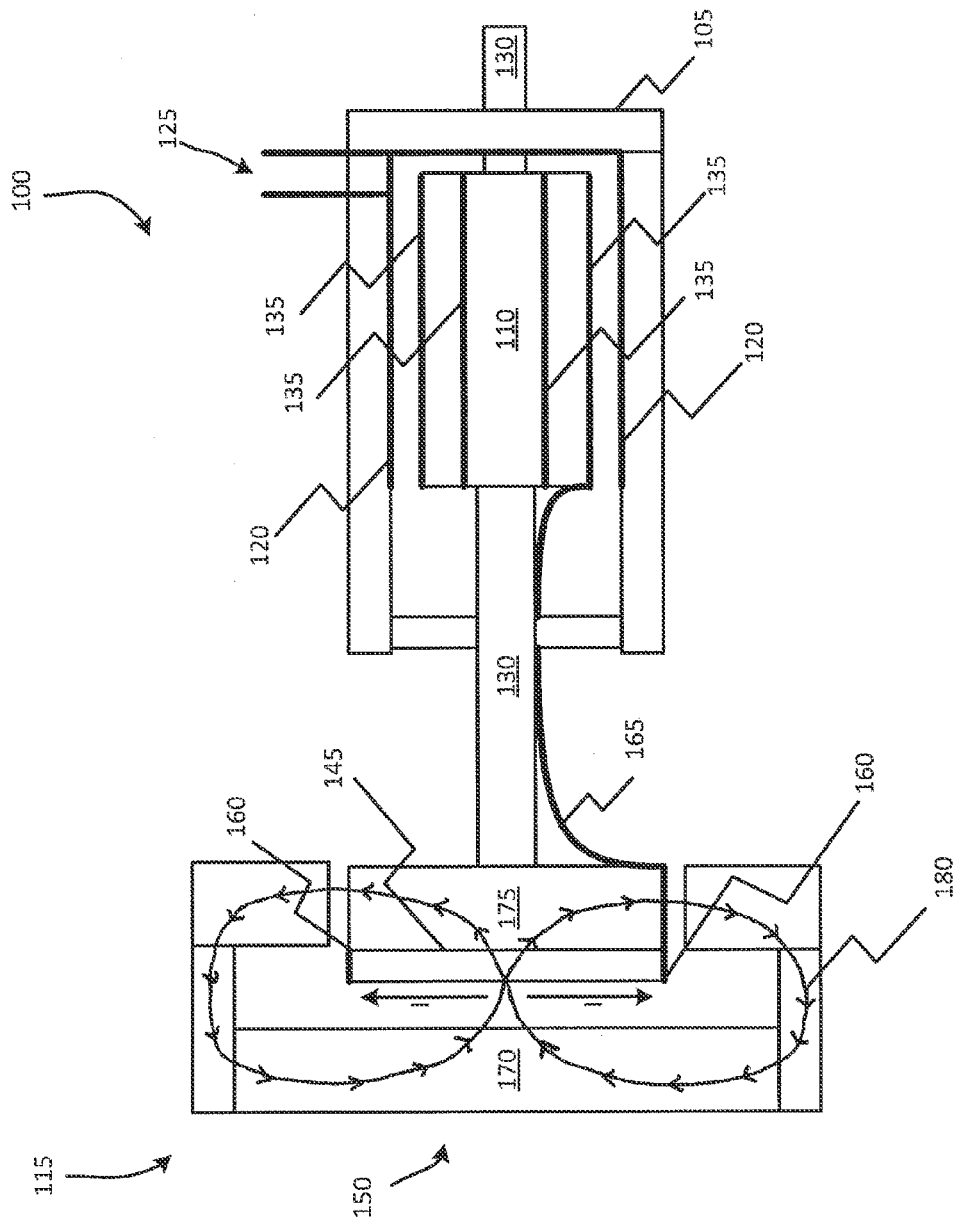
FIG. 1 is a cross-sectional view of an alternator according to one embodiment of the invention.

FIG. 1 illustrates an alternator 100 according to one embodiment of the invention. The alternator 100 produces electrical energy in the form of alternating current. The alternator 100 includes a stator 105, a rotor 110, and an exciter 115.

The stator 105 includes a plurality of stator armature coils 120 and electrical output terminals 125. In some embodiments, the stator armature coils 120 are comprised of copper wire. In other embodiments, the stator armature coils are comprised of another conductive material (e.g., aluminum, silver, etc.). The stator armature coils 120 are operable to produce alternating current upon interaction with a rotating magnetic field. The terminals 125 output the alternating current produced by the stator armature coils 120.

The rotor 110 includes a shaft 130 and a plurality of conductors 135. More particularly in the embodiments shown, the conductors 135 are main field conductors. The shaft 130 is coupled to a mechanical energy source (e.g., an internal combustion engine, a turbine steam engine, a waterwheel, a windmill, etc.). As the mechanical energy source provides rotational power, the rotor 110 rotates. The main field conductors 135 permit the flow of current (for example, direct current) around the rotor poles 122 to produce a rotor magnetic field. In order to produce a rotor magnetic field having the necessary magnetic field strength, the main field conductors 135 require a constant number of amp-turns (i.e., current amperage flowing through the main field conductors 135 multiplied by the number of times the main field conductors 135 are wrapped around the rotor 110).

In some embodiments, the rotor 110 further includes secondary windings (sometimes referred to as damper windings). In such an embodiment, the main field conductors 135 are used to generate the magnetic field that rotates within the stator 105, while the secondary windings are short circuited and used to reduce harmonic distortion in the output of the stator 105. In some embodiments, the secondary windings include conductive wire wrapped around the rotor 110, while the main field conductors 135 are contained within the rotor 110. In other embodiments, the secondary windings are welded to the rotor 110.

In one embodiment, the main field conductors 135 are integrated into the rotor 110 via a casting process. In another embodiment, the main field conductors 135 are integrated into the rotor 110 via a fusion process (for example, welding). In yet another embodiment, the main field conductors 135 are integrated into the rotor 110 via a fastening process, such as bolting.

Figure 2:
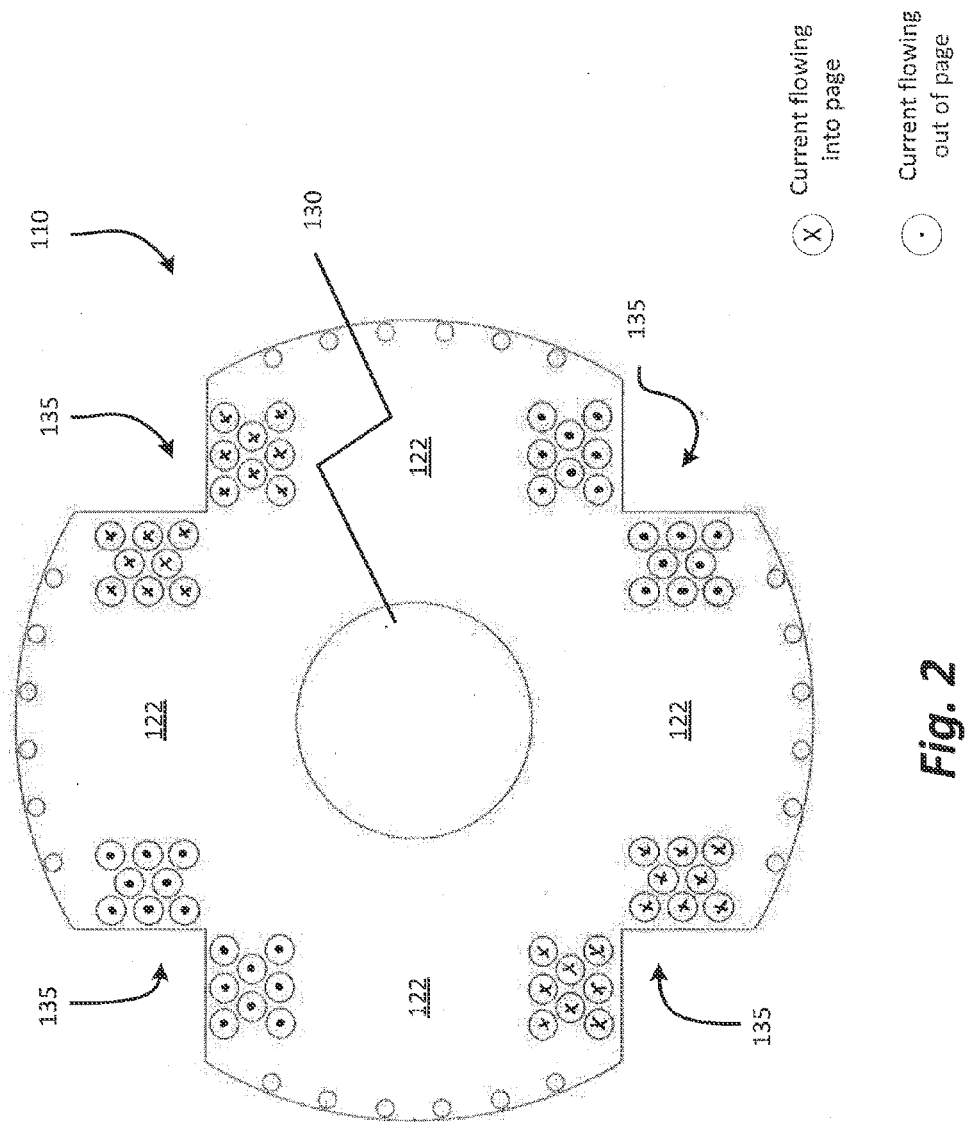
FIG. 2 is a cross-sectional view of a rotor of the alternator of FIG. 1.

FIG. 2 illustrates a front view of the rotor 110 including main field conductors 135 integrated into the rotor 110. As noted, integration of the main field conductors 135 in the rotor can be achieved via one of a number of processes. When the casting process is used, punched iron disks, or laminations, containing holes for the main field conductors 135 are stacked. The stacked iron disks are placed in a permanent mold or die-casting die. A molten conductive metal (i.e., aluminum, copper, etc.) is then poured or otherwise introduced into the mold (for example, under pressure such as in an injection-molding process) to create the main field conductors 135.

In another embodiment, the main field conductors 135 are integrated into the rotor 110 via the welding process. The welding process includes stacking the iron disks containing the holes for the main field conductors 135. Conductive rods are placed within the holes of the stacked iron disks. In such an embodiment, the rods are then fused at either end of the rotor 110 to end connections. The fused rods form the main field conductors 135. The electrical connection between the rods and the end connections is accomplished via the weld. In yet another embodiment, the rods are fastened to end connections to form the main field conductors 135. The electrical connection between the rods and the end connections is accomplished via surface contact.

In operation, the stator 105 remains stationary while the rotor 110 rotates within the stator 105. Current flowing in the main field conductors 135 of the rotor 110 produces the rotor magnetic field, which rotates with respect to the stator armature coils 120. The rotating rotor magnetic field within the stator 105 produces a time-varying voltage through the stator armature coils 120. In the embodiment shown, the voltage is AC voltage. The voltage is output through the terminals 125. A load is electrically connected to the terminals 125. A current is induced upon connecting the load to the terminals 125.

The main field conductors 135 are integrated into the rotor 110 via a casting/fusion/bolting process and encircle the rotor 110 a relatively low number of times. Therefore, in order to produce the rotor magnetic field required to induce the time-varying current through the stator armature coils 120, current flowing through the main field conductors 135 must have a relatively high amperage. Traditional methods of exciting the main field conductors 135, such as using a slip ring or brushes, are not operable to supply the necessary current to the main field conductors 135. Further, brushless exciter systems require expensive and large electronic systems, including rectifying components.

FIGS. 3A and 3B illustrate a front view and a rear view, respectively, of the exciter 115. The exciter 115 provides electricity to the main field conductors 135 of the rotor 110. In some embodiments the electricity provided by the exciter 115 to the conductor 135 is substantially direct current and has an amperage sufficient to produce the required rotor magnetic field. In the embodiment, shown the exciter 115 includes a conductive disk 145, a magnetically permeable carrier 150, a conducting rim 160, and a field-current connection 165. The disk 145 is an electrically conductive disk. The disk 145 is coupled to the shaft 130 and rotates along with the rotor 110.

The magnetically permeable carrier 150 includes a stationary component 170 and a rotating component 175. The stationary component 170 remains stationary. The rotating component 175 is coupled to the shaft 130 and rotates along with the disk 145 and the rotor 110. In some embodiments, the magnetically permeable carrier 150 is composed of iron. In other embodiments, the magnetically permeable carrier 150 is composed of another magnetically permeable material. In some embodiments, the magnetically permeable carrier 150 includes a carrier field winding. When direct current passes through the carrier field winding, a uniform static magnetic field 180 is produced. The uniform static magnetic field 180 flows through the disk 145 in a perpendicular direction to the disk 145 and a parallel direction to the shaft 130.

The rim 160 electrically connects the disk 145 to the field-current connection 165. The field-current connection 165 further electrically connects the disk 145 to the main field conductors 135 of the rotor 110. Although shown as being located outside the shaft 130, in other embodiments, the field-current connection 165 is located within keyways inside the shaft 130. Although not shown, the field-current connection 165 further electrically connects the main field conductors 135 to the center of the disk 145 to provide a completed circuit for flow of current.

In operation, as the shaft 130 is rotated, the disk 145 rotates within the uniform static magnetic field 180 produced by the magnetically permeable carrier 150. As the disk 145 rotates within the uniform static magnetic field 180, direct current (I) is produced radially from the center of the disk 145 to the periphery. The direct current (I) travels from the center of the disk 145 to the outer edge of the disk 145. The conducting rim 160, which is electrically connected to the outer edge of the disk 145, directs the direct current to the main field conductors 135 of the rotor 110 via the field-current connection 165. The direct current flows through the main field conductors 135 and back to the center of the disk 145, producing the rotor magnetic field. The rotating rotor magnetic field within the stator 105 induces a current through the armature coils 120. The induced current is outputted via terminals 125 as alternating current.

Figure 4:
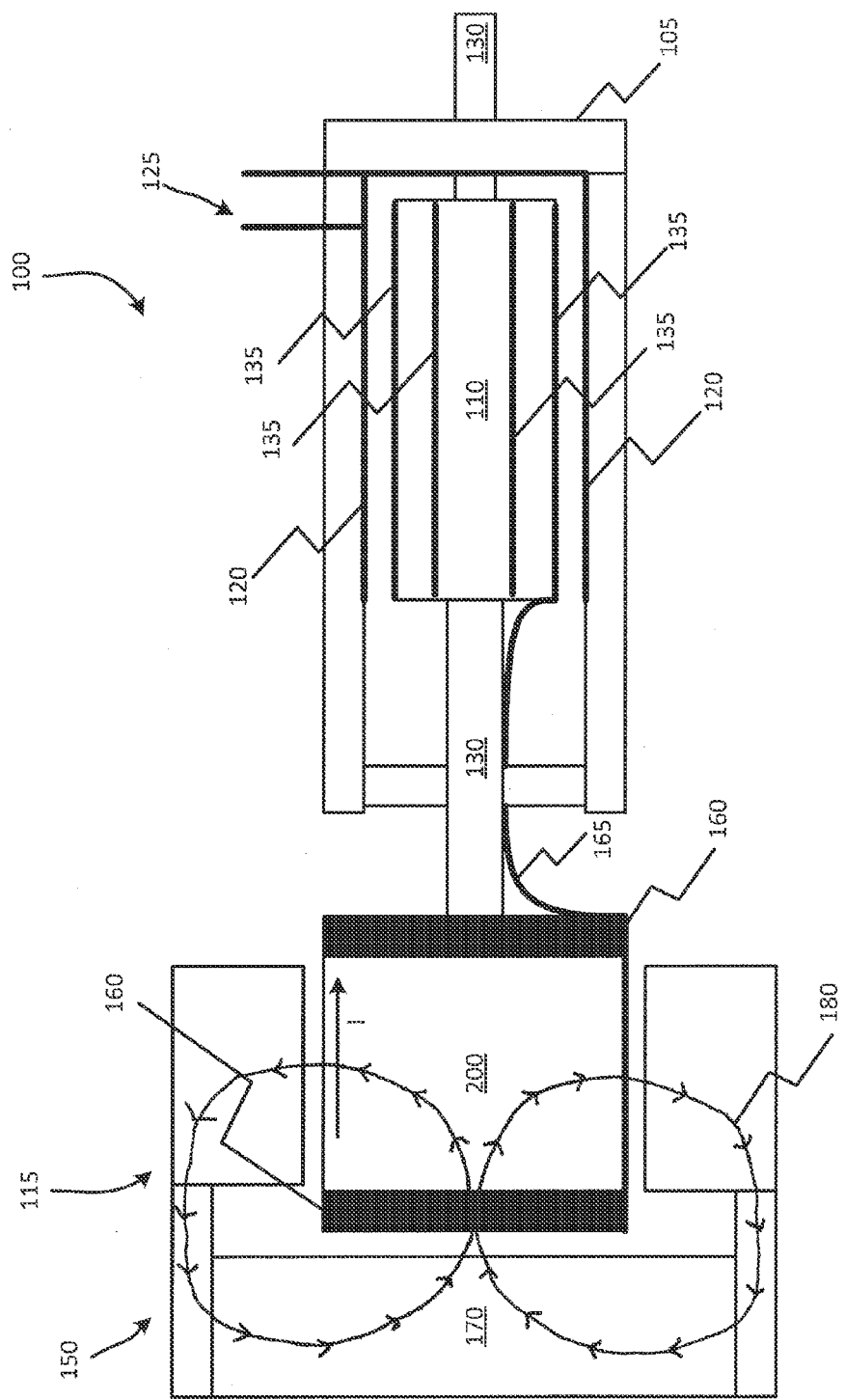
FIG. 4 is a cross-sectional view of an alternator according to another embodiment of the invention.
Figure 5:
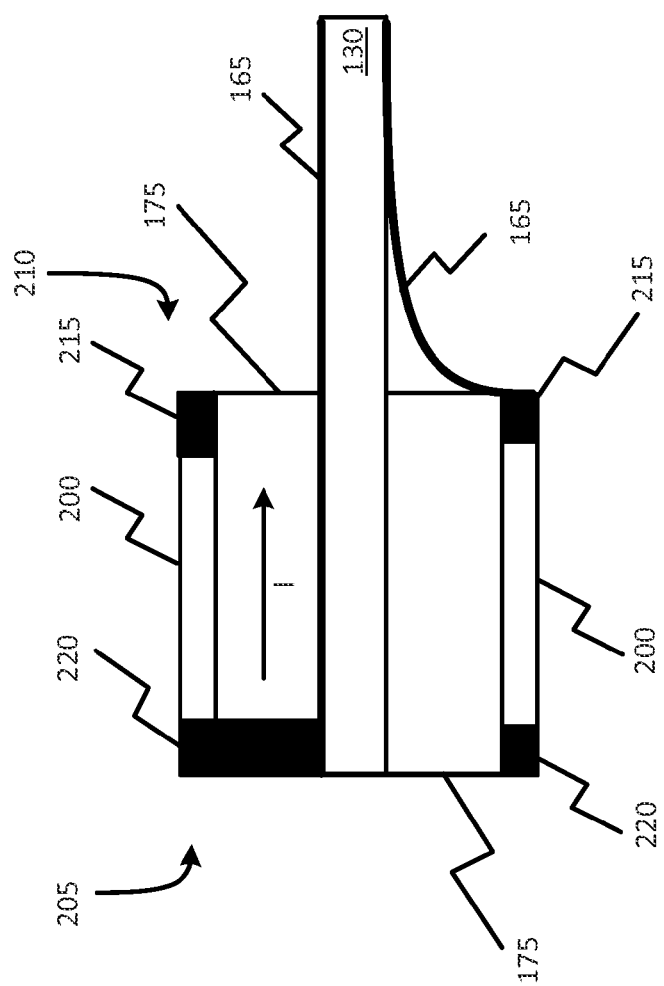
FIG. 5 is a cross-section view of a portion of an exciter of the alternator of FIG. 4.

FIGS. 4 and 5 illustrate the alternator 100 according to another embodiment of the invention. In such an embodiment, rather than a disk 145, the alternator 100 includes a conductive drum 200. In operation, as the drum 200 rotates within the uniform static magnetic field 180, direct current (I) is produced along the axial length. The direct current (I) travels from the first end 205 of the drum 200 to a second end 210 of the drum 200. A conducting rim 215, which is electrically connected to the second end 210, directs the direct current to the main field conductors 135 of the rotor 110 via the field-current connection 165. The direct current flows through the main field conductors 135 and back to an inputting conducting rim 220. The inputting conducting rim 220 is electrically connected to the first end 205 of the drum 200.

Thus, the invention provides, among other things, a self-excited alternator for generating electrical energy. Various features and advantages of the invention are set forth in the following claims.

What is claimed is:

1. A self-excited alternator comprising:
   a stator including
     a plurality of armature coils, and
     an electrical output terminal electrically connected to the plurality of armature coils,
   a rotor operable to rotate within the stator, the rotor including
     a shaft, and
     one or more conductors operable to receive a direct current and produce a rotor magnetic field upon receiving the direct current, wherein the conductors are integrated within the rotor via one of a casting process, a welding process, or a fastening process; and
   an exciter including
     a magnet producing a static magnetic field, and a rotatable conductive member coupled to the shaft and electrically coupled to the one or more conductors, the rotatable conductive member operable to output the direct current to the one or more conductors upon rotation within the static magnetic field;

wherein the rotation of the rotor magnetic field within the stator produces an alternating current through the plurality of armature coils, the alternating current being output via the electrical output.

2. The self-excited alternator of claim 1, wherein the one or more conductors are main field conductors.

3. The self-excited alternator of claim 1, further including one or more damping windings.

4. The self-excited alternator of claim 1, wherein the rotatable conductive member is one of a disk and a drum.

5. The self-excited alternator of claim 1, wherein the magnet is one of an electro-magnet and a permanent magnet.

6. The self-excited alternator of claim 1, wherein the magnet includes a stationary portion and a rotating portion.

7. The self-excited alternator of claim 1, further including a field-current connection for electrically coupling the rotatable conductive member to the one or more conductors.

8. The self-excited alternator of claim 5, wherein the field-current connection is contained within the shaft.

9. The self-excited alternator of claim 8, further including a conductive rim surrounding the rotatable conductive member, the conductive rim operable to electrically couple the rotatable conductive member to the one or more conductors.

10. A method of self-exciting an alternator, the method comprising:
producing a static magnetic field;
rotating a rotatable conductive member within the static magnetic field;
outputting a direct current produced as a result of rotating the rotatable conductive member within the static magnetic field;
receiving the direct current at a plurality of conductors positioned within a rotor;
rotating the rotor within a stator to produce a rotating magnetic field; and
outputting an alternating current from the stator, the alternating current produced as a result of the rotating magnetic field;
wherein the conductors are positioned within the rotor via one of a casting process, a welding process, or a fastening process.

11. The method of claim 10, wherein the rotatable conductive member is one of a disk and a drum.

12. The method of claim 10, wherein the rotatable conductive member is electrically coupled to the one or more conductors via a conductive rim and a field-current connection.

13. The method of claim 10, wherein the static magnetic field is produced by one of an electro-magnet and a permanent magnet.

14. A self-excited alternator comprising:
a stator including
a plurality of armature coils, and
an electrical output terminal electrically connected to the plurality of armature coils,
a rotor operable to rotate within the stator, the rotor including
a shaft, and
one or more conductors each conductor operable to receive a direct current, produce a rotor magnetic field in response to receiving the direct current, and integrated within the rotor via one of a casting process, a welding process, or a fastening process; and
an exciter including
a magnet producing a static magnetic field, and
a rotatable conductive member coupled to the shaft and electrically coupled to the one or more conductors, the rotatable conductive member operable to output the direct current to the one or more conductors upon rotation within the static magnetic field;
wherein the rotation of the rotor magnetic field within the stator produces an alternating current through the plurality of armature coils, the alternating current being output via the electrical output.

15. The self-excited alternator of claim 14, wherein the rotatable conductive member is one of a disk and a drum.

16. The self-excited alternator of claim 14, wherein the magnet is one of an electro-magnet and a permanent magnet.

17. The self-excited alternator of claim 14, wherein the magnet includes a stationary portion and a rotating portion.

18. The self-excited alternator of claim 14, further including a field-current connection for electrically coupling the rotatable conductive member to the one or more conductors.

19. The self-excited alternator of claim 18, wherein the field-current connection is contained within the shaft.

20. The self-excited alternator claim 14, further comprising a conductive rim surrounding the rotatable conductive member, the conductive rim operable to electrically couple the rotatable conductive member to the one or more conductors.

21. The self-excited alternator of claim 14, wherein the one or more conductors are main field conductors.

22. The self-excited alternator of claim 14, further including one or more dampening windings.

23. A method of self-exciting an alternator, the method comprising:
producing a static magnetic field;
rotating a rotatable conductive member within the static magnetic field;
outputting a direct current produced as a result of rotating the rotatable conductive member within the static magnetic field;
positioning a plurality of conductors within the rotor via one of a casting process, a welding process, or a fastening process;
receiving the direct current at the plurality of conductors positioned within a rotor;
rotating the rotor within a stator to produce a rotating magnetic field; and
outputting an alternating current from the stator, the alternating current produced as a result of the rotating magnetic field.

24. The method of claim 23, further comprising configuring the rotatable conductive member as one of a disk and a drum.

* * * * *